(12) United States Patent
Marode et al.

(10) Patent No.: US 8,099,294 B2
(45) Date of Patent: Jan. 17, 2012

(54) INVENTORY CONTROL AND OPTIMIZATION

(75) Inventors: Olivier Marode, Villefranche sur Mer (FR); Denis Arnaud, Grasse (FR)

(73) Assignee: Amadeus S.A.S., Sophia Antipolis Cedex (FR)

( * ) Notice: Subject to any disclaimer, the term of this patent is extended or adjusted under 35 U.S.C. 154(b) by 766 days.

(21) Appl. No.: 12/157,495

(22) Filed: Jun. 10, 2008

(65) Prior Publication Data

US 2009/0287518 A1 Nov. 19, 2009

(30) Foreign Application Priority Data

May 14, 2008 (EP) .................................... 08305168

(51) Int. Cl.
  *G06Q 10/00* (2006.01)
(52) U.S. Cl. ........................................................ 705/1.1
(58) Field of Classification Search .................. 705/7
  See application file for complete search history.

(56) References Cited

U.S. PATENT DOCUMENTS

| | | | |
|---|---|---|---|
| 5,918,209 A | | 6/1999 | Campbell et al. |
| 6,006,202 A | * | 12/1999 | Ramaswamy et al. .......... 705/28 |
| 6,032,123 A | | 2/2000 | Jameson |
| 7,249,068 B1 | * | 7/2007 | Kakouros et al. .............. 705/28 |
| 7,650,294 B1 | * | 1/2010 | Carter et al. .................. 705/10 |
| 2003/0225593 A1 | | 12/2003 | Ternoey et al. |
| 2003/0225738 A1 | | 12/2003 | Ternoey et al. |
| 2004/0236641 A1 | * | 11/2004 | Abbott et al. ................... 705/28 |
| 2005/0182911 A1 | * | 8/2005 | Kaiser .......................... 711/170 |

FOREIGN PATENT DOCUMENTS

WO  WO2005/062195   7/2005

OTHER PUBLICATIONS

Larson, Douglas M. and Hardie, Ian W. "Seller behavior in stumpage markets with imperfect information." Land Economics , v65 , n3 , p. 239 Aug. 1989.*

* cited by examiner

*Primary Examiner* — Matthew Gart
*Assistant Examiner* — Seye Iwarere
(74) *Attorney, Agent, or Firm* — Drinker Biddle & Reath LLP

(57) ABSTRACT

A method of revenue management of an inventory of items in order to optimize the availability of one or several item(s) requested by a user, method comprising the steps of calculating an online estimate of a first element associated with the request; calculating an online estimate of a second element associated with the request; comparing the estimate of the first and second element to determine whether or not requested items can be granted to the requestor. The optimized calculations take place in real time and are handled by a single on-line system that does not need to rely on uploads of recommendations from an external off-line optimization system.

14 Claims, 2 Drawing Sheets

INVENTORY CONTROL AND OPTIMIZATION

FIELD OF THE INVENTION

The present invention relates to a method and apparatus for improving inventory control and optimizing the manner in which this is provided, particularly but not exclusively in respect of optimizing an inventory in the travel domain.

BACKGROUND OF THE INVENTION

In industry, inventory systems are commonplace. This is particularly the case in the travel industry. An inventory system is one which can control availability of resources, for example through pricing, revenue management associated with profit or cost and any calculations associated therewith. This enables a customer to purchase or book an available resource, for example, a hotel room, a seat on a vehicle such as an airplane or a train, or any other suitable resource. In addition, the inventory system allows a provider to manage the available resources and maximize revenue and profit in provision of these resources to the customer.

In general today's inventories in the travel domain are controlled by means of recommendations uploaded from an offline revenue management system. Whilst these work, there are a number of problems with their operation. In particular, the process of relying on an offline upload is both time-consuming and cumbersome. In addition, the offline revenue management system tends to make too many calculations, and not necessarily at the right time in the process, which again causes problems of delay and unnecessary processing. In addition, the data on which the off-line computation is made may not be up-to-date at the time the optimization process takes place. Finally, the current off-line revenue management systems degrade their network optimizations by using intermediate recommendations messages to the on-line request evaluation system, since these recommendations may not convey all the dimensions of the optimal solution.

A number of solutions have been proposed to improve the revenue management problem, but all rely on off-line computations of recommendations. For example, "Revenue management in a dynamic network environment" (MIT/INSEAD: Transportation Science, Vol. 37, No. 3, August 2003, pp. 257 to 277.) discloses a method for optimizing the calculation of availability in a booking domain. The method uses two systems, one online and one offline. The online system is merely indicated and there is no suggestion of any technical details. The patent literature in the form of WO05/0621958 discloses a method and apparatus for revenue management of callable products such as airlines and hotels. Similarly, U.S. Pat. No. 5,918,209 discloses a method and system for determining marginal values for use in a revenue management system. Both patent documents disclose a single system for optimizing revenue by selectively deciding what to sell, to whom, and at what price.

Effective revenue management is critical to the success of many inventory systems. The main disadvantage of existing revenue management systems is that they are traditionally offline systems computing recommendations meant to be used in an online environment. This is a historic distinction that has remained a problem. The result of offline computing is recommendations based on input data that may not be up to date at the time the recommendations are used by the online requested evaluation system. There is a number of unnecessary calculations carried out which may never be used in controlling the inventory. Improvements have emerged with the advent of dynamic pricing approaches, but again, the overall method is still based on imperfect information that is generated at regular intervals rather than at the time required by the system. In addition, maintaining interfaces between two such systems is intrinsically a source of cost and potential problems and a solution is sought to overcome this.

SUMMARY OF THE INVENTION

An object of the present invention is to alleviate at least some of the problems associated with the prior art systems.

A further object of the present invention is to provide a method and apparatus to dynamically optimize an inventory as requests come in.

According to one aspect of the present invention there is provided a method of managing an inventory of items in order to optimize revenue which can thereby be generated, by optimizing the revenue generated by one or more available items requested by a user by means of a request, the method comprising the steps of: calculating an online estimate of a first element (such as marginal revenue) associated with the available item; calculating an online estimate of a second element (such as opportunity cost) associated with the available item; comparing the estimates of the first and second elements; and accepting the request when the online estimate of the first element is substantially equal to or above the online estimate of the second element.

According to a second aspect of the present invention there is provided an inventory management system to manage an inventory of items to optimize the revenues generated, thereby optimizing the revenue generated by one or more available items which are requested by a user by means of a request; the system comprising: an online calculator for estimating a first element associated with the available item; an online calculator for estimating a second element associated with the available item; a comparator module for comparing the first and second element estimates; and an acceptance module for accepting the request when the estimate of the first element is substantially equal to or above the estimate of the second element.

There are many advantages provided by the present invention. For example, by operating the inventory system of the present invention the requirement to rely on pre-computed values from the revenue management system is alleviated. In fact, the current revenue management systems become substantially redundant as a result of the present invention. In addition, the inventory system of the present invention is able to update its controls at its own request at its own required time. As a result, offline communication with any other system and associated data storage are no longer required.

Also, the inventory system of the present invention provides for a system that performs the calculations required at the point when they are required by the next incoming request, rather than at a time dictated by another system. In addition, the revenue optimized inventory system can evaluate in real-time, dynamically, both marginal revenue and network opportunity cost for any incoming request. The ability to do this online in real time means that the best and most up to date data is always used for any calculation which in turn guarantees maximum profit. Availability transactions can also be handled with the present improved inventory system. That results in an increase in accuracy in the opportunity cost evaluations with each incoming request, and in addition renders irrelevant the historical differentiation between online inventory systems and offline revenue optimization systems.

Such a method of controlling an inventory may be referred to as a Dynamic Inventory Control.

BRIEF DESCRIPTION OF THE DRAWINGS

Reference will now be made, by way of example, to the accompanying drawings, in which.

DETAILED DESCRIPTION OF THE EMBODIMENTS

The present invention relates to a revenue management method and system, which can evaluate online, the marginal revenue (MR) and the opportunity costs (OC) in the framework of a unique event driven revenue optimized inventory system. The evaluation and comparison of marginal revenue and opportunity costs are referred to as dynamic inventory controls. Using the present invention there is increase in the accuracy of the optimization and a simplification of the business processes, due to the combination of optimization and inventory processes in the framework of an online system. The system operates using a single GUI, simplified data management and full control of the end-to-end process. This avoids the need for multiple system interfacing and inaccurate data and calculations, as would be the case in the prior art. The below described revenue optimized inventory system increases revenue gains by suppressing the potential suboptimal decisions taken between two offline optimizations. In addition, the inherent suboptimal bid price heuristics in the network environment are avoided. By dramatically reducing the business complexity by merging two systems into a single system, flight analysts can be in full control of the end-to-end process of marketing and selling their inventory for maximum revenue.

Figure 1:
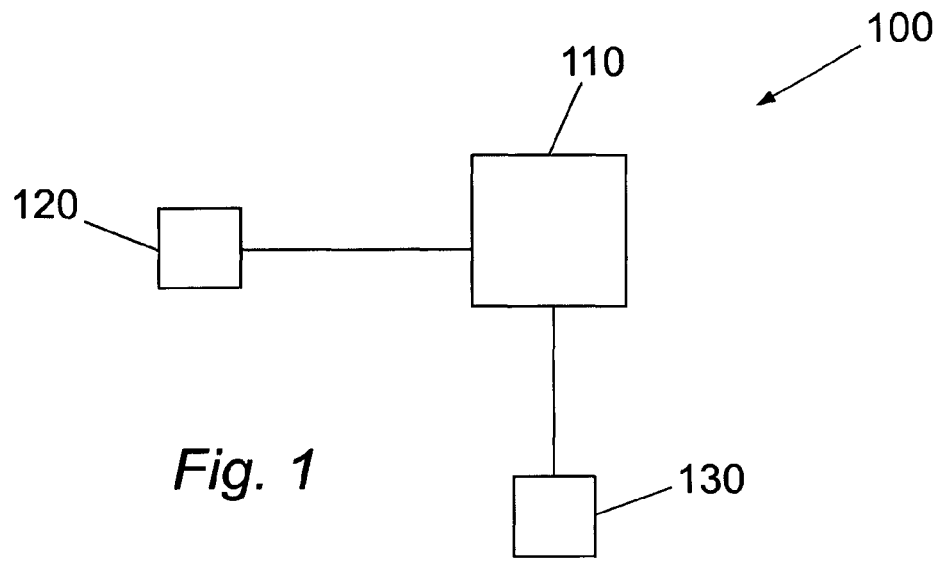
FIG. 1 is a block diagram of the overall process of the revenue optimized inventory system in accordance with one embodiment of the present invention, by way of example.

The present invention will now be described with reference to an inventory and revenue management system for the sale and reservation of airline seats. This is merely one example, to demonstrate the system and method, and it will be appreciated that the present invention can apply to other inventory and revenue management systems, other than those relating to the sale and reservation of airline seats. FIG. 1 is a block diagram of a possible inventory and management system 100 in accordance with an embodiment of the present invention. The system 100 includes a revenue optimized inventory system 110 which may form part of an airline booking, distribution and reservation system (not shown). Customers 120 and suppliers 130 may be connected to the airline booking system 110. The airline booking system 110 includes a number of different functional modules (not shown in FIG. 1 but explained with reference to FIG. 2 and FIG. 3) that provide information and resources to facilitate operation of the present invention and which are described below.

Figure 2:
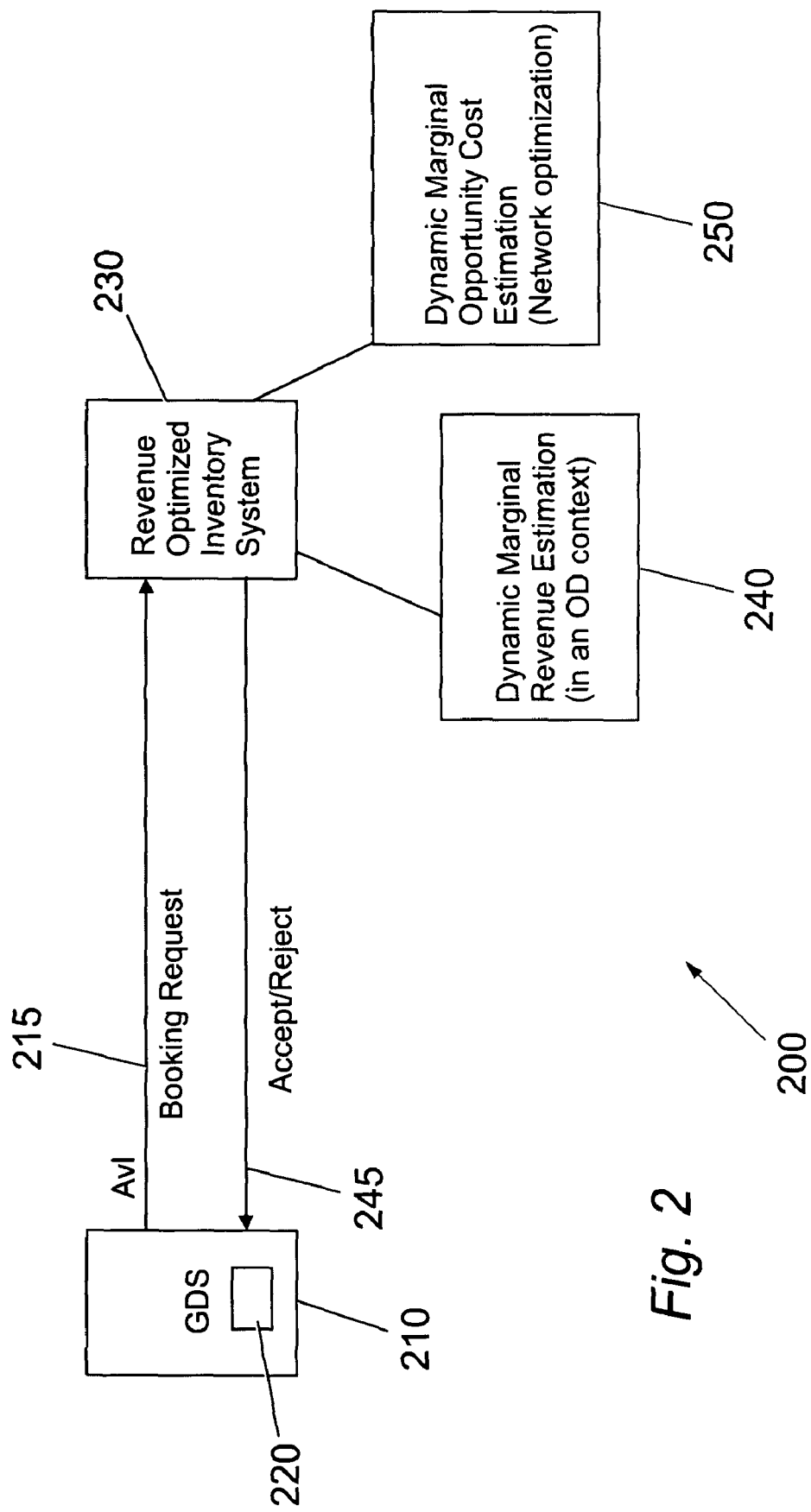
FIG. 2 is a block diagram, demonstrating an architecture of the revenue optimized inventory system in accordance with one embodiment of the present invention, by way of example.

Referring now to FIG. 2, the airline booking system details are now described. The airline booking system is shown generally as 200 and includes a global distribution system (GDS) 210, a reservation system 220 and a revenue optimized inventory system 230. An incoming request (not shown) from a customer is received at the GDS 210. The GDS includes the reservation system 220. The incoming request includes all expected information for a passenger wishing to travel on an airline to a destination. For example, the information includes departure point, arrival point, date and fare class of booking, number of passengers, etc. The customer may be an individual, a booking agent, or any other corporate or personal entity. The GDS then generates a booking request 215. The booking request 215 is passed to the revenue optimized inventory system 230. The revenue optimized inventory system 230 then dynamically determines a marginal revenue estimation 240 based on the booking request through online determinations, and a marginal opportunity cost estimation 250 based on the booking request through a network optimization. The estimations are compared, as will be described below, and a decision is made as to whether or not to accept the booking request (215). The acceptance or rejection of the booking request is communicated from the revenue optimized inventory system 230 to the GDS 210, by means of message 245. The GDS 210 then communicates the decision to the original customer.

One of the modules included in the revenue optimized inventory system is a revenue management module which aims to evaluate the necessary and sufficient conditions to grant a sales transaction between a customer willing to pay a maximum amount for a certain service and a service provider willing to sell this service not below a minimum price, to enable acceptance of a request. Two essential necessary and sufficient conditions that should be met for an airline to accept the sale of a seat or leg of a journey are as follows:

- the evaluated marginal revenue (MR) must be greater than the associated opportunity cost (OC). This equates to the traditional revenue management problem of determining the point at which to sell a commodity, if it is expected that more lucrative use of the commodity can be made in the future.
- The evaluated marginal revenue must be equal to the estimated willingness to pay (WTP) of the customer. This relates to the traditional issue of determining whether or not to sell a commodity at a price lower than the customer is prepared to pay and which is the maximum price above which the customer will not pay.

After the marginal revenue has been evaluated, the optimal inventory decision function F is in the form:

$$F(\text{request})=MR(\text{request})-OC(\text{request, network});$$

where F must be positive in order for the sale to be accepted.

The revenue management model evaluates both marginal revenue and opportunity cost as accurately as possible by reducing the complexity of the instantaneous network state and the complexity of the request to a sufficient level for the purposes required. In addition, the implementation of the algorithm involved to make the optimal sales decision can be operated and calibrated online. There are particular advantages to being able to determine an online evaluation of the opportunity costs, which advantages have not been provided in any known systems. The advantages include the ability to use real and accurate data for all calculations. There is no reliance on batch data which can be out of date very quickly. As the functions of inventory control and revenue management are carried out by the same system (rather than two systems in the prior art) there are cost savings, further efficiencies, no requirements for complex interfacing, training and interoperability.

In accordance with the present invention, the expected network revenue Rnetwork (a), expected from the sale of the remaining capacity (where the network is in a state "a") can be compared with the revenue after acceptance of the request Rnetwork (b), similarly expected from the sale of the remaining capacity minus the potential sale (where "b" is the state of the network after the to-be-made sale). This comparison can give rise to the value of opportunity cost, in accordance with the following formula:

$$OC(\text{request, network}) = R\text{network}(b) - R\text{network}(a)$$

This formula is valid irrespective of the method chosen to calculate the values of Rnetwork. For example, an applicable method may be one that is a leg-based system such as an expected marginal seat revenue (EMSR) based system or the method may be a network-based system.

The present invention embodies the concept of an online inventory platform, offering optimization and availability calculation features in the scalable community environment. The following steps are examples of essential or optional steps required to be taken by the revenue optimized inventory in order to accept or deny an incoming request for a given itinerary, in a given class of service (or given mix of classes), for a given number of travelers:

Determine the itinerary associated with the incoming request (also referred to as "O&D path" for Origin & Destination path).

Estimate the marginal revenue of the request.

Estimate the cancellation and no-show probability of the request (optional).

Estimate the impact on demand forecasting of the request (optional).

Estimate the opportunity cost of the request and the network.

Accept or deny the request based on the calculations made.

Each of the above-mentioned steps will now be described in greater detail, by way of example. Methods of handling marginal revenue estimation can take many different forms. For example, a look up in a database of O&D path yields or a sophisticated rule-based evaluation model, which takes into consideration many attributes of the request. O&D means Origin & Destination, i.e., the union of one or several flight segments. For instance, the "BA341-BA179" O&D (departing from Nice, FR, and arriving at New York, USA) is the union of the BA341 (departing from Nice, FR, and arriving at London, UK) and BA179 (departing from London, UK, and arriving at New York, USA) flight segments. An "O&D path" is the union of the fare classes of all the flight segments traversed by an O&D. For instance, the "BA341/D-BA179/C" O&D path means the union of both the D fare class on the BA341 flight segment and C fare class on the BA179 flight segment. An example of the attributes of the requests which may be taken into consideration in the present example include: journey data, itinerary data, point of sale, point of commencement, fare rule conditions, class of service, interline and code sharing pro-rations, product demand, demand elasticity, etc. The manner in which the marginal revenue estimation is made is not an essential part of the invention; however, the output from such estimation is required for all future calculations in accordance with the present invention. Accordingly, the manner of determining the marginal revenue can be as described above or any other appropriate manner.

Once the marginal revenue has been estimated, online re-evaluation of the initial forecasted remaining demand (subsequently named D) in the light of the booking event (request) takes place. This requires a determination of the extent to which the incoming request conveys information related to the forecast demand in order to optimize the operation. The remaining demand may be evaluated from a Bayesian point of view, considering the parameters of distribution are essentially unknown. Thus every new booking provides information which enables a more accurate estimation to be made, and hence the distribution parameters will vary as new requests or bookings are received. The implementation will take into consideration the distribution, as known at the point at which the request or booking is received. From this distribution, an online calculation of the most probable demand D' will be determined. The demand, net of cancellations and no-shows, will be assumed to be at least superior to the bookings already in the inventory, including impact of the present request. When the step of the re-evaluation of the forecasted remaining demand is not performed (since it is optional), obviously D' equals to D. The value of demand D' then becomes an input of the calculation of Rnetwork (a); and (D' minus the number of seats in the present request) then becomes an input to the calculation of Rnetwork (b).

After the calculations described above, a determination is made as to whether or not to accept the request made by the customer; this will be described in greater detail below. Other optional calculations and determinations may also be made before deciding whether to accept or deny the request.

One optional evaluation is in respect of the probability of cancellation or "no-show" of the customer making the request, in order to provide a degree of overbooking for such eventualities. Factors which affect the likelihood of cancellation or no-show include route, date, tier of travel, booking class, point of sale, etc. This may be achieved by implementing an overbooking profile (cancellation and no-show) for each booking class, which may then update an overbooking profile database to take into account, in the calculation of the Opportunity Cost (OC), the overbooking profile per segment, class, point of sale or whatever can be applied online by an appropriate forecasting module.

Other optional evaluations may also be made depending on the nature of the inventory system in question and the nature of the requests and products to which the inventory system relate.

A further evaluation in accordance with the present invention is the online opportunity cost evaluation. As previously indicated above, the opportunity cost can be defined as follows:

$$OC(\text{request, network}) = R\text{network}(b) - R\text{network}(a).$$

The state in either case is to be understood to be defined in terms of an overbooked network with remaining capacity for sale, and in terms of remaining demand forecasts for that remaining capacity. The calculation of Rnetwork, given the state, may be implemented using a Linear Programming (LP) mechanism in a network context, since linear programming complexity is generally manageable in a real-time frame; see for example Section "3.3.1 The Deterministic Linear Programming Model", pp 93-95, of the G. van Ryzin & K. Talluri book (The Theory and Practice of Revenue Management, Springer, ISBN 0-387-24376-3).

Calculating the Opportunity Cost (OC) on-line using Linear Programming (LP) consistently outperforms off-line Bid-Price (BP) heuristic methods. In addition, methods exist to use stochastic demand in a linear programming context so that the method can easily be extended to account for stochasticity as long as computational time remains under control.

If the opportunity cost is known to be zero, as will be the case if the forecasted load factor for each leg shows that the flight will not fill up whatever happens, calculations relating to opportunity cost need not be carried out. The present invention assumes that linear computation applies in relation to the whole network, but may similarly apply to any sub-network of the whole. For example, in relation to a particular airline, a particular route, a particular point of sale, or through prior identification of the optimal O&D path. In certain circumstances, the method may require more than one linear optimization between the state before sale and after sale. In such circumstances, it is reasonable to assume that the optimal solution of both problems can be approximated by heuristic methods.

Forecasted load factors may be provided in an offline context, as they relate to long term trends and change over longer periods and, as such, online access may not be necessary.

As the present invention relates to an online system the ability to view all legs of a journey are provided. This gives a better ability to determine which request to accept and which to reject. For example, if a passenger wishes to travel to Bangkok from Nice, at least two flights would be required (e.g. Nice-Paris; Paris-Bangkok). The second leg of the journey (Paris—Bangkok) may influence the decisions on accepting or rejecting a value statement for the first leg. As overall the airline would sell more seats. To be able to view the request with up to date online data ensures the best decisions are made.

Figure 3:
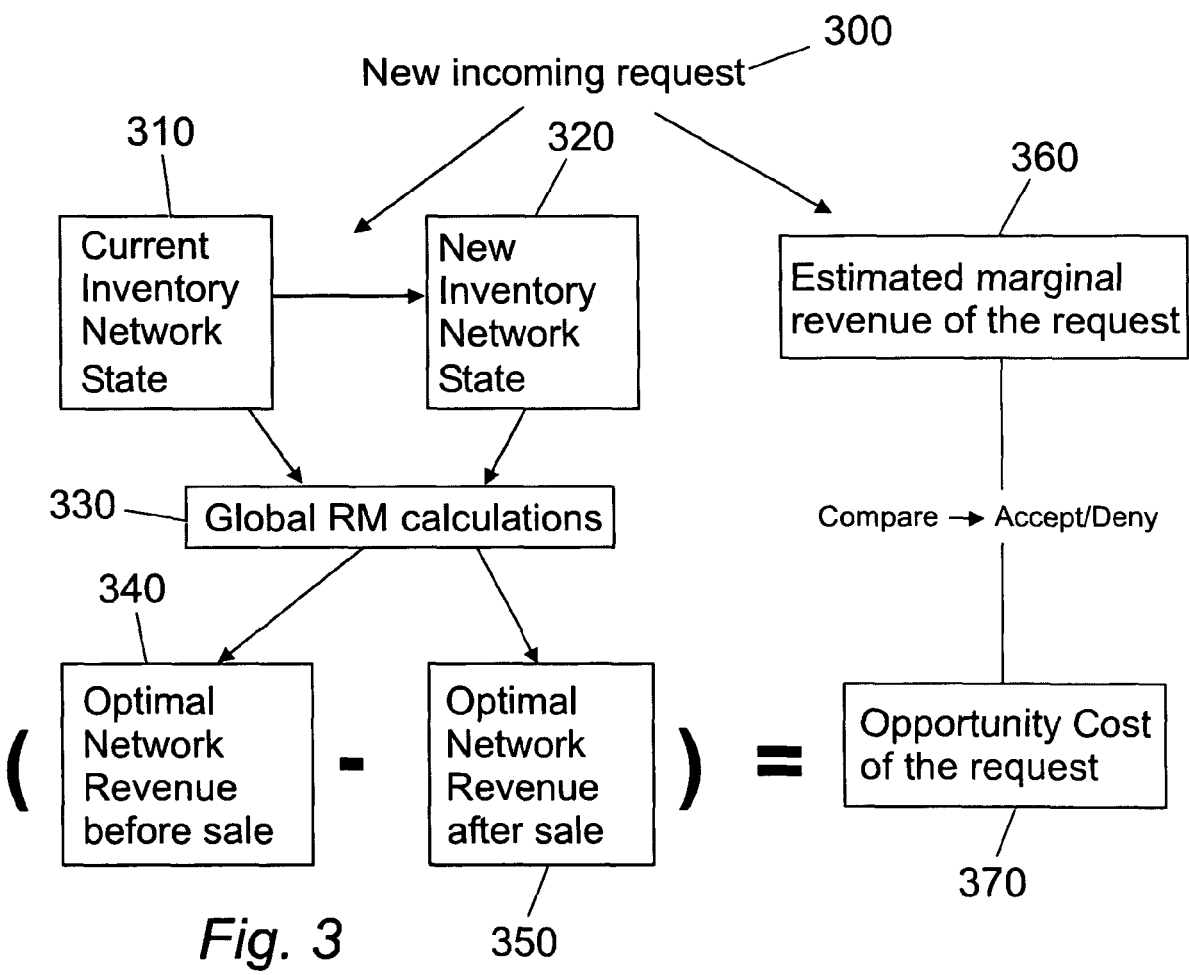
FIG. 3 is a flow chart, demonstrating part of the process of the FIGS. 1 and 2 apparatus in accordance with one embodiment of the present invention, by way of example.

The step of determining whether or not to accept or deny the request will now be described with reference to FIG. 3. A new incoming request 300 is received at a booking engine associated with airline or equivalent supplier. The request may come by means of a direct customer via the Internet or any other online service, by means of a booking agent, or in any other appropriate way. The current inventory network state 310 and the new inventory network state after the sale 320 are then used in global revenue management module 330 to estimate the optimal network revenue after the sale 340, and the optimal network revenue before the sale 350, as a result of the new incoming request. In parallel, the new incoming request gives rise to an estimated marginal revenue (also referred as yield) of the request 360. From the optimal revenue and the new optimal revenue figures, 350 and 340, the opportunity cost of the request is determined 370. A numerical comparison is made between the estimated yield of the request and the opportunity cost of the request to determine whether or not to accept the request. The comparison is numeric. The marginal revenue (numerical value, expressed in a given currency) is compared with the opportunity cost (also a numerical value expressed in the same given currency). The marginal revenue is a yield, altered by a demand elasticity factor (which can be equal to 1). For example, a booking request for the O&D path "BA341/D-BA179/C" is expected to yield (bring marginal revenue of), say, $2000 to the airline. That has to be compared with the opportunity cost, say, $1800. The opportunity cost can be seen as the minimal price (revenue) at which the airline will sell a seat (otherwise, it looses money on that seat). Hence, a comparison is made to determine whether the airline is making sufficient revenue to sell the seat.

In order to determine whether sufficient revenue is generated, the whole process accepts only requests which maximize the revenue generated by the sale or potential sale of seats. To optimize the revenue, comparisons are made, for example with a threshold value. The threshold is, for example, the required revenue level to accept a request form a customer. Any such threshold may be provided online and updated as circumstances change. Alternatively, the comparison could be based on all available requests and selection of those where the revenue is maximized in order of revenue. Many other means of comparison could also be used.

It will be appreciated that various combinations of method steps, in combination or alone, may be carried out for different elements of the overall process. The various combinations are not limited to those described above; instead they may include any other combination. For example, the invention may be used to allocate or assign places in different environments, such as theatre seats, rental cars, airplane seats, apartments, other accommodation etc (i.e., any perishable goods and services). It will be appreciated that in each different environment, the characteristics, criteria and rules analyzed will be different.

The resources stored in the inventory are any item available or otherwise which may be requested by a user, depending on the application of the system and method. The item will depend on the exact application of the inventory system or methods, and similarly the calculations relating to commercial parameters will depend on different elements than the marginal revenue and the opportunity costs described above. Again, these elements and parameters will depend on the exact nature of the application of the invention and be apparent to the person skilled in the art.

It will be appreciated that this invention may be varied in many different ways and still remain within the intended scope and spirit of the invention.

Furthermore, a person skilled in the art will understand that some or all of the functional entities as well as the processes themselves may be embodied in software, or one or more software-enabled modules and/or devices.

The invention claimed is:

1. A method of managing an inventory of items to optimize revenues generated by selling the inventory of items by optimizing the revenue generated from a decision to sell or not sell one or more available items which are requested by a user by means of a request, the method comprising the steps of:

calculating an online estimate, via a computer, of a marginal revenue associated with the evaluation of an appropriate price for each item at the time of the request and calculating an online estimate via a computer, of an opportunity cost associated with the decrement of the inventory resulting from a potential acceptance to sell each requested item by means of a comparison using a linear processing based methodology of a first network metric associated with a predicted optimal revenue of selling all remaining inventory items before the request and a second network metric associated with a predicted optimal revenue of selling all remaining inventory items after each requested item is removed from the inventory, wherein the comparison is repeated for another first metric of a sub-network related to specific characteristics of the requested item and another second metric of the sub-network;

comparing via a computer, the estimates of the marginal revenue and opportunity costs;

accepting via a computer, the request when the online estimate of the marginal revenue is substantially equal to or above the online estimate of the opportunity cost;

updating, via a computer, the value of the first metric to equal that of the second metric for a future request if the request is accepted, wherein each estimate for each online request is in real time;

forecasting, via a computer, a criterion related to the probability of the sale of each requested item to include in the calculation for estimating the opportunity cost.

2. The method of claim 1, further comprising rejecting the request when the on-line estimate of the marginal revenue is below the on-line estimate of the opportunity cost.

3. The method of claim 1, further comprising comparing the estimate of the marginal revenue and opportunity cost by means of a mathematical operation.

4. The method of claim 1, further comprising comparing multiple requests to select the requests for acceptance which optimize the revenue.

5. The method of claim 1, further comprising receiving a request from a user for an item and determining the availability of the item.

6. The method of claim 1, further comprising communicating the acceptance of the request to the user.

7. The method of claim 1, further comprising calculating at least one commercial parameter from the group comprising subsequent allocation of an item with different effects or statistical determination; overbooking considerations; and forecast impacts.

8. An inventory management system to manage an inventory of items to optimize the revenues generated by selling the inventory of items by optimizing the revenue generated from a decision to sell or not sell one or more available items which are requested by a user by means of a request; the system comprising:

an online calculator for estimating a marginal revenue associated with the evaluation of an appropriate price for each item at the time of the request and an online calculator for estimating an opportunity cost associated with the decrement of the inventory resulting from a potential acceptance to sell each requested item by means of a comparison using a linear processing based methodology of a first network metric associated with a predicted optimal revenue of selling all remaining inventory items before the request and a second network metric associated with a predicted optimal revenue of selling all remaining inventory items after each requested item is removed from the inventory wherein the comparison is repeated for another first metric of a sub-network related to specific characteristics of the requested item and another second metric of the sub-network;

a comparator module for comparing the marginal revenue and opportunity cost estimates;

an acceptance module for accepting the request when the estimate of the marginal revenue is substantially equal to or above the estimate of the opportunity cost;

an updating module for updating the value of the first metric to equal that of the second metric for a future request if the request is accepted; wherein each estimate for each online request is in real time;

a forecasting module for forecasting a criterion related to the probability of the sale of each requested item to include in the calculation for estimating the opportunity cost.

9. The system of claim 8, wherein a request is rejected when the online estimate of marginal revenue is below the online estimate of opportunity cost.

10. The method of claim 8, wherein the estimate of marginal revenue and opportunity cost is made by means of a mathematical operation.

11. The method of claim 8, wherein multiple requests are compared to select the requests for acceptance which optimize the revenue.

12. The method of claim 8, wherein a request from a user for an item includes determining the availability of the item.

13. The method of claim 8, wherein the acceptance of the request is communicated to the user.

14. The method of claim 8, wherein at least one commercial parameter from the group comprising subsequent allocation of an item with different effects or statistical determination; overbooking considerations; and forecast impacts is calculated.

* * * * *